US011892804B2

(12) United States Patent
Papi

(10) Patent No.: US 11,892,804 B2
(45) Date of Patent: Feb. 6, 2024

(54) TIMEPIECE MECHANISM INTENDED TO BE DRIVEN THROUGH A VARIABLE NUMBER OF STEPS

(71) Applicant: Manufacture d'Horlogerie Audemars Piguet SA, Le Brassus (CH)

(72) Inventor: Giulio Papi, La Chaux-de-Fonds (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 447 days.

(21) Appl. No.: 17/127,576

(22) Filed: Dec. 18, 2020

(65) Prior Publication Data

US 2021/0191330 A1 Jun. 24, 2021

(30) Foreign Application Priority Data

Dec. 20, 2019 (CH) .................................... 01680/19

(51) Int. Cl.
*G04B 19/253* (2006.01)

(52) U.S. Cl.
CPC ................................ *G04B 19/2536* (2013.01)

(58) Field of Classification Search
CPC .......... G04B 19/2536; G04B 19/25333; G04B 19/21
See application file for complete search history.

(56) References Cited

U.S. PATENT DOCUMENTS 368,961 A 8/1887 Morton
3,350,873 A * 11/1967 Egger .................... G04B 19/24 968/170
5,699,321 A * 12/1997 Vaucher ............. G04B 19/2536 368/37
9,471,038 B2 * 10/2016 Carreno ........... G04B 19/25306
2006/0215497 A1 9/2006 Schneider
2008/0181060 A1 7/2008 Mahler et al.
2008/0279049 A1 11/2008 Schmiedchen et al.
(Continued)

FOREIGN PATENT DOCUMENTS

CH 713 288 6/2018
CN 101236402 A 8/2008
(Continued)

OTHER PUBLICATIONS

International Search Report for CH Application No. 16802019 dated May 26, 2020, 3 pages.

*Primary Examiner* — Renee S Luebke
*Assistant Examiner* — Matthew Hwang
(74) *Attorney, Agent, or Firm* — NIXON & VANDERHYE

(57) ABSTRACT

Disclosed is a timepiece mechanism which has a mobile including a tooth of a first type and a tooth of a second type, and a pawl that is intended to move the mobile by at least one step on each actuation and has a travel that is liable to move the mobile by two steps on each actuation. This timepiece mechanism has a correction mobile designed to define different paths of the pawl, depending on the state thereof, the pawl and the correction mobile being designed such that, on each actuation of the pawl: the pawl moves the mobile by one step; and the pawl moves the mobile by an additional step only when the correction mobile is in a predefined state and the tooth of the second type is situated along the travel of the pawl.

20 Claims, 6 Drawing Sheets

(56) References Cited

U.S. PATENT DOCUMENTS

| | | | |
|---|---|---|---|
| 2012/0188852 A1 | 7/2012 | Chaignat et al. | |
| 2012/0243382 A1 | 9/2012 | Goeller | |
| 2016/0154380 A1* | 6/2016 | Papi | G04B 19/2538 368/28 |
| 2016/0154381 A1 | 6/2016 | Papi | |
| 2016/0202664 A1 | 7/2016 | Carreno et al. | |
| 2018/0157213 A1 | 6/2018 | Saglini | |
| 2018/0314209 A1 | 11/2018 | Saglini | |

FOREIGN PATENT DOCUMENTS

| | | | |
|---|---|---|---|
| CN | 101326469 | A | 12/2008 |
| CN | 102608902 | A | 7/2012 |
| CN | 102692864 | A | 9/2012 |
| CN | 105652632 | A | 6/2016 |
| CN | 105652634 | A | 6/2016 |
| CN | 105785744 | A | 7/2016 |
| CN | 108153135 | A | 6/2018 |
| CN | 108241284 | A | 7/2018 |
| CN | 108803298 | A | 11/2018 |
| CN | 109426131 | A | 3/2019 |
| EP | 1 785 783 | | 5/2007 |
| EP | 3 026 504 | | 6/2016 |
| FR | 2095176 | | 2/1972 |

* cited by examiner

TIMEPIECE MECHANISM INTENDED TO BE DRIVEN THROUGH A VARIABLE NUMBER OF STEPS

This application claims priority to CH Patent Application No. 01680/19 filed Dec. 20, 2019, the entire contents of each of which are hereby incorporated by reference.

TECHNICAL FIELD

The present invention relates to a timepiece mechanism for a timepiece movement, having

- a mobile comprising a toothset having at least one tooth of a first type and at least one tooth of a second type,
- a jumper designed to cooperate with the toothset so as to define discrete positions of the mobile,
- a pawl intended to be actuated by a drive mobile of the timepiece movement in order to act on the toothset and move the mobile by at least one step on each actuation.

According to a preferred embodiment, the timepiece mechanism may take the form of an annual, or perpetual, date display mechanism.

PRIOR ART

Such timepiece mechanisms have been known for a long time in the prior art in relation to different types of application, in particular in display mechanisms.

Thus, for example, the patent EP 3026504 B1 illustrates and describes an annual or perpetual date mechanism that complies with the above features. More specifically, that mechanism has a date wheel, bearing a hand for indicating the date, having thirty teeth of a first type and one tooth of a second type. The date wheel is driven by a first beak of an actuating pawl, once per day, in order to increment the display of the date. The actuating pawl comprises a second beak shaped, relative to the toothset of the date wheel, so as only to be able to cooperate with the tooth of the second type at the ends of months with fewer than 31 days. The actuating pawl is associated with a month wheel, driven so as to execute one turn in four years in order to take account of leap years, this month wheel having 48 notches, each of which corresponds to a given month, and the depth of which depends on the length of the corresponding month. The actuating pawl comprises a feeler intended to cooperate with the notches of the month wheel in order to define the starting position of the actuating pawl depending on the length of the current month. The notches are arranged such that the shorter a month, the deeper the corresponding notch and the sooner the second beak of the actuating pawl is able to cooperate with the tooth of the second type in the month, while turning the date wheel by a greater number of steps. The second beak is also shaped such that it does not drive the date wheel at the ends of months with 31 days.

Thus, it is apparent from the above explanation that the actuating pawl has a single total path that it will pass through in its entirety only during months of February with 28 days, that is to say when the feeler engages in the deepest notches of the month wheel, in order to define the longest travel of the actuating pawl, making it possible to advance the date wheel by four steps. The travel is reduced during months of February with 29 days in such a way that the date wheel is driven only by three steps, whereas it is reduced even more during months with 30, and then 31 days, the path of the actuating pawl during months with more than 28 days only corresponding to a portion of the total path passed through during months of February with 28 days.

Such a design makes it necessary to provide a relatively large diameter for the month wheel, in order to take into account the maximum possible travel for the actuating pawl, this not always being desirable depending on the space available in the corresponding timepiece movement. Moreover, great precision is necessary, both for manufacturing components of this mechanism and for the assembly thereof, in order to ensure that this mechanism for driving the date wheel operates properly.

SUMMARY OF THE INVENTION

A main aim of the present invention is to propose a timepiece mechanism having an alternative design that is more compact compared with mechanisms of this type that are already known.

To this end, the present invention relates more particularly to a timepiece mechanism of the type indicated above, wherein the pawl may exhibit a travel such that it is able to act on the toothset in order to move the mobile by two steps on each actuation, wherein the timepiece mechanism may have a correction mobile having at least one first state and at least one second state, different from the first state, the correction mobile being designed so as to be able to cooperate with the pawl, during the actuation of the latter, to define at least two different paths of the pawl that are associated with the first state and with the second state, respectively, and by the fact that the pawl and the correction mobile are designed such that, on each actuation of the pawl:

- the pawl acts on the toothset to move the mobile by one step, and
- the pawl acts on the toothset to move the mobile by an additional step only when the correction mobile is in a second state and the tooth of the second type is situated along the travel of the pawl.

By virtue of these features, the correction mobile intervenes to modify the path of the pawl during the actuation thereof, and can hence be arranged in the vicinity of the mobile that the pawl drives, in any rate closer than in the case of the month wheel, in the abovementioned date display mechanism, in as much as the month wheel needs to be able to position the pawl before the actuation thereof. Thus, the timepiece mechanism according to the present invention can be realized in a much more compact manner than the equivalent mechanisms of the prior art. Moreover, the positioning of the correction mobile makes it possible to substantially simplify the adjustments that are necessary during the assembly of the mechanism compared with the mechanisms of the prior art.

Preferably, the mobile, the pawl and the correction mobile may be designed such that the travel of the pawl has two successive phases: an optional driving phase in which the toothset is able to be driven by only one step when the correction mobile is in a second state and the tooth of the second type is situated along the travel of the pawl, and a systematic driving phase in which the toothset is able to be driven by one step, regardless of the type of tooth situated along its travel and regardless of the state of the correction mobile.

In this case, provision may also be made for the mobile to be designed to pivot and to have an internal toothset, and for the mobile, the pawl and the correction mobile to be designed such that the optional driving phase occurs before the systematic driving phase.

Provision may also be made for each of the teeth of the first type to have an active flank, intended to cooperate with the pawl, that is different from the active flank of the tooth of the second type, such that the cooperation between the pawl and the toothset in the optional driving phase, when the correction mobile is in a second state, only gives rise to a force driving the mobile that is sufficient to overcome the action of the jumper when a tooth of the second type is situated along the travel of the pawl.

In this case, provision may also be made for the active flank of the tooth of the first type to comprise, from the bottom of the toothset, a first portion having a first mean inclination, with respect to the radial direction, and then a second portion having a second mean inclination, with respect to the radial direction, greater than the first mean inclination, and for the active flank of the tooth of the second type to have a third mean inclination, with respect to the radial direction, smaller than the second mean inclination.

Provision may thus advantageously be made for the second mean inclination to be substantially between 30 and 85 degrees with respect to the radial direction, preferably between 35 and 55 degrees.

Alternatively or in addition, provision may be made for the first mean inclination to be substantially between 0 and 25 degrees with respect to the radial direction, preferably between 5 and 15 degrees.

Alternatively or in addition, provision may be made for the third mean inclination to be substantially between 0 and 25 degrees with respect to the radial direction, preferably between 5 and 15 degrees.

Generally, provision may be made for the correction mobile to have a cam against the periphery of which the pawl is kept in abutment during the optional driving phase, in order for it to be able to modify the path of the pawl, the periphery of the cam having at least first and second radii that are different and associated with the first and second states, respectively, of the correction mobile.

In this case, provision may advantageously be made for the correction mobile to have a toothset intended to cooperate with at least one tooth of the mobile that exhibits a length greater than that of the other teeth of the mobile, in order to modify the angular orientation of the cam.

According to a preferred embodiment variant, the present invention may relate to a timepiece mechanism that complies with all or some of the features that have just been set out, and in which the mobile is intended to be secured to a date display mobile or to drive the latter,

- the toothset having thirty teeth of the first type and one tooth of the second type,
- the pawl being intended to be actuated once per day in order to move the mobile by one or two steps, and
- the correction mobile being a month mobile designed such that its angular orientation, associated at each moment with a given month, passes from one month to the next at each month end.

The present invention also relates to a timepiece movement and a timepiece having a timepiece mechanism that complies with the above features.

BRIEF DESCRIPTION OF THE DRAWINGS

Further features and advantages of the present invention will become more clearly apparent from reading the following detailed description of a preferred embodiment, given with reference to the appended drawings, which are given by way of non-limiting example and in which.

EMBODIMENT(S) OF THE INVENTION

The following detailed description aims to describe a timepiece mechanism according to a preferred embodiment of the present invention by way of non-limiting illustrative example. More specifically, according to the embodiment illustrated and described, the timepiece mechanism has the form of annual date display mechanism 1 but, of course, a person skilled in the art could implement other types of timepiece mechanisms that employ the features set forth in the claims without departing from the scope of the present invention.

Figure 1:
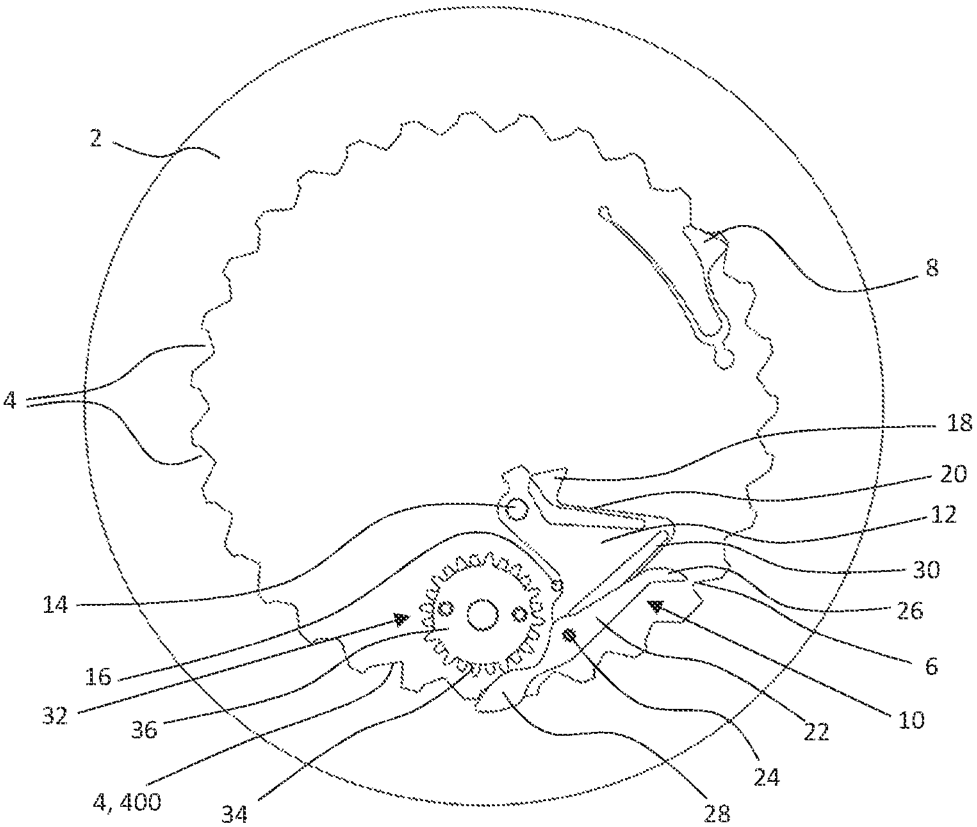
FIG. 1 shows a bottom view of a part of a timepiece mechanism according to a preferred embodiment of the present invention, the correction mobile being in a first state.
Figure 2:
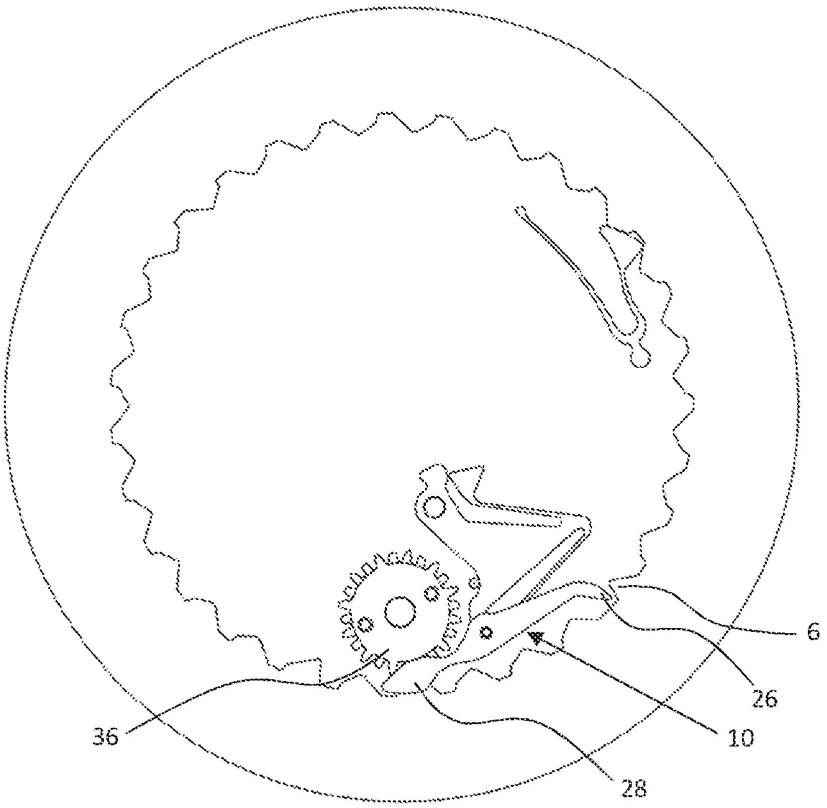
FIG. 2 shows a view similar to the one in FIG. 1, the correction mobile being in a second state.

FIGS. 1 and 2 show one and the same bottom view of a part of the annual date display mechanism 1 according to a preferred embodiment of the invention, illustrated with its lower face visible, that is to say its face that is intended to be situated on the bottom side of the case of the corresponding timepiece, respectively in two different configurations. More particularly, FIG. 1 illustrates the configuration of the mechanism 1 on 30 October before the change of the date, while FIG. 2 illustrates the configuration thereof on 30 November, likewise before the change of the date.

The mechanism 1 has a mobile 2, in this case in the form of a date disc, having an internal toothset comprising thirty teeth of a first type 4 and one tooth of a second type 6.

A jumper 8 is designed to cooperate with the toothset of the mobile 2 and to define a plurality of discrete positions of the latter, in this case thirty-one.

The mechanism 1 also has a pawl 10 intended to be actuated by a drive mobile of the timepiece movement (not shown, typically a 24-hour wheel for example in the case of a date display mechanism) in order to act on the toothset of the mobile 2 and move the latter by at least one step on each actuation.

The pawl 10 in this case has, by way of non-limiting illustration, a rigid base 12 intended to be pivoted with respect to the corresponding timepiece movement about an axis of rotation 14. The base 12 is kept in a rest position illustrated in FIGS. 1 and 2 under the effect of the action of a return member (not shown) that tends to push it into abutment against a fixed pin 16. An actuating tooth 18 is secured to the base 12 by way of an elastic connection 20, the actuating tooth 18 typically being intended to cooperate with the drive mobile of the associated timepiece movement in order to ensure that the pawl 10 moves, by rotation of the base 12 in the anticlockwise direction of rotation in FIGS. 1 and 2.

An arm 22 is furthermore mounted on the base 12 so as to pivot about an axis of rotation 24. The arm 22 bears a beak 26, at a first end, that is intended to cooperate with the toothset of the date mobile 2 so as to turn the latter in the anticlockwise direction of rotation in FIGS. 1 and 2 (in the clockwise direction in FIGS. 4 to 6*c*) when the pawl 10 moves under the effect of the action of the drive mobile. Furthermore, the arm 22 bears a tail 28, the edge of which that is directed towards the centre of the timepiece movement has a convex shape, the function of which will be explained below.

A spring 30, formed in this case in one piece with the base 12, is designed to act on the arm 22 and tends to turn it in the clockwise direction of rotation in the view in FIGS. 1 and 2.

Figure 3:
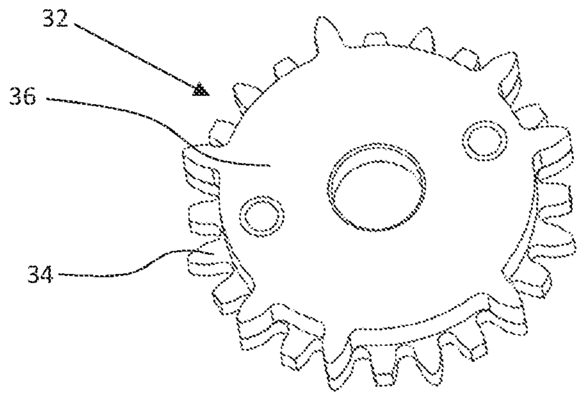
FIG. 3 shows a perspective view of the correction mobile.

The mechanism 1 furthermore has a correction mobile 32, shown in detail in FIG. 3, which is realized in this case in the form of two superposed wheels 34, 36, which rotate as one and one of which has a 24-tooth toothset, every other tooth of which is slightly truncated, and the other one of which has seven teeth corresponding to the long months having 31 days.

The first, 24-tooth wheel 34 is intended to allow the correction mobile 32 to be driven in rotation, by cooperation thereof with a prominent tooth 400 that has a greater height than the others for this purpose. In the embodiment presented, the prominent tooth 400 is a tooth of the first type 4, but other arrangements are possible for driving the correction mobile.

The second wheel 36 acts as a cam for the pawl 10, cooperating with the tail 28 thereof, the periphery of the wheel 36 in this case comprising portions having at least two different radii. Specifically, by virtue of the shape of the second wheel 36 and the seven teeth that it comprises, the correction mobile 32 can exhibit two different states with respect to the pawl 10, a first state, illustrated in FIG. 1, in which one tooth of the second wheel 36 defines a stop for the tail 28, and a second state, illustrated in FIG. 2, in which the second wheel 36 has an empty space between two teeth facing the tail 28, the pawl then bearing against a portion of the second wheel 36 with a smaller radius than in the first state.

It is apparent from a comparison on FIGS. 1 and 2 that, in at least some positions of the base 12, under the effect of the action of the spring 30, the tail 28 is kept in abutment against the correction mobile 32 and the beak 26 is situated further away from the toothset of the date mobile 2 when the correction mobile 32 is in a first state (FIG. 1) than when the latter is in a second state (FIG. 2).

Thus, in the first case, on 30 October, when the pawl 10 is actuated by the drive mobile, with its base 12 pivoting in the anticlockwise direction of rotation, its beak 26 has a path such that it cannot come into contact with the tooth of the second type 6 on account of the interaction of its tail 28 with the correction mobile 32. When the movement of the pawl 10 continues, the beak 26 continues its travel along a path such that it comes into contact with the tooth of the first type 4 situated immediately after the tooth of the second type 6, in order to advance the date mobile 2 by one step in the anticlockwise direction of rotation.

The display of the day of the month then passes from 30 to 31 (October) and the pawl 10 returns to its rest position as illustrated in FIG. 1 after the drive mobile stops acting. The next day, during the actuation of the pawl 10 by the drive mobile, the beak 26 will again exhibit the same travel extending through two steps of the date mobile 2, with the same path passing, during a first phase, at a distance from a first tooth (in this case the tooth of the first type 4 situated immediately after the tooth of the second type 6) and then intercepting, in a second phase, the tooth of the second type 6 so as to advance the date mobile by one step, causing the display of the date to pass from 31 (October) to 1 (November).

It will be seen that the base 12 of the pawl 10 has the same rest position in both states of the correction mobile, this not being the case for corresponding mechanisms of the prior art, as mentioned above. Thus, regardless of the state of the correction mobile 32, the pawl 10 follows the same travel; in other words, it is moved such that it is capable of advancing the mobile 2 by two steps on each actuation by the drive mobile.

It is apparent from FIG. 2 that the pawl 10 has a different path when it is actuated during a short month with fewer than 31 days from the one that it has when it is actuated during a long month with 31 days. Specifically, with the beak 26 being situated in the vicinity of the toothset of the mobile 2, the path of the pawl 10 will directly intercept the first tooth situated along the travel of the pawl 10, in this case the tooth of the second type 6, as early as the first phase of the travel, in order to drive the date mobile by a first step during this phase. The pawl 10 then continues to move in a second phase, driving the tooth of the second type 6 by an additional step, as will become more clearly apparent from the following explanations in relation to FIGS. 5*a* to 5*e*. Thus, the display of the date passes directly from 30 (November) to 1 (December) in a single actuation of the pawl 10.

Generally, it is apparent from the above explanations that the pawl 10 systematically has a travel that allows it to advance the mobile 2 by two steps, this travel being able to be broken down into two successive phases, an optional driving phase and a systematic driving phase corresponding to the above-described first and second phases, respectively.

Furthermore, it will be noted that, while each tooth of the mobile 2 has an active flank intended to cooperate with the pawl 10, the active flank of the teeth of the first type 4 is different from the active flank of the tooth of the second type 6. Generally, provision may be made for the teeth of the first type 4 and the tooth of the second type 6 to be differentiated such that the cooperation between the pawl 10 and the toothset of the mobile 2 in the optional driving phase, when the correction mobile 32 is in a second state, only gives rise to a force driving the mobile 2 that is sufficient to overcome the action of the jumper 8 when the tooth of the second type 6 is situated along the travel of the pawl 10. Thus, in the case of the design illustrated, the teeth of the first type 4 are intended to cooperate with the pawl 10 from the first day of the month until the penultimate day of the month, while the tooth of the second type 6 is intended to cooperate with the pawl 10 on the last day of the month, whether the current month has 30 or 31 days. When the correction mobile 32 is in a first state, the pawl 10 can only act on the tooth of the second type 6 on the 31st day of the month (FIG. 1, month of October), while it can act thereon as early as the 30th day of the month when the correction mobile 32 is in a second state (FIG. 2, month of November).

It is thus clear that the correction mobile 32 cooperates with the pawl 10 in order to define two different paths thereof, one of which is associated with the first state and the other of which is associated with the second state, the travel of the pawl 10 for its part remaining unchanged in both cases, and corresponding to a movement of the pawl 10 that is liable to advance the mobile 2 by two steps in all cases.

More specifically here, the differentiation between the types of teeth according to the preferred embodiment of the invention, by way of non-limiting illustration, resides in the respective geometries thereof. Specifically, the active flank of a tooth of the first type 4 comprises, from the bottom of the toothset, a first portion having a first mean inclination, with respect to the radial direction, and then a second portion having a second mean inclination, with respect to the radial direction, greater than the first mean inclination. In a different way, the active flank of the tooth of the second type 6 has a third mean inclination, with respect to the radial direction, smaller than the second mean inclination. It is thus possible to define inclinations of the different portions of the teeth and a shape for the beak 26 such that, when these teeth lie along the travel of the pawl corresponding to the optional driving phase, the pawl can slide over the second portion of the active flank of a tooth 4 of the first type, as illustrated in the configuration in FIG. 4, while it would act on the active flank of the tooth of the second type 6 in order to drive the mobile 2, as shown in FIGS. 5*a* and 5*b*.

By way of non-limiting illustrative example, provision could be made for the first and third mean inclinations both to be substantially between 0 and 25 degrees with respect to the radial direction, preferably between 5 and 15 degrees (without necessarily having the same value). The second mean inclination could be substantially between 30 and 85 degrees with respect to the radial direction, preferably between 35 and 55 degrees.

By virtue of such angles, when a tooth of the first type 4 is situated on the path of the pawl 10 during the optional driving phase, the beak 26 comes into contact with the second portion of the corresponding active flank, said second portion being inclined too much for the pawl 10 to be able to drive the mobile 2 in this case.

Figure 4:
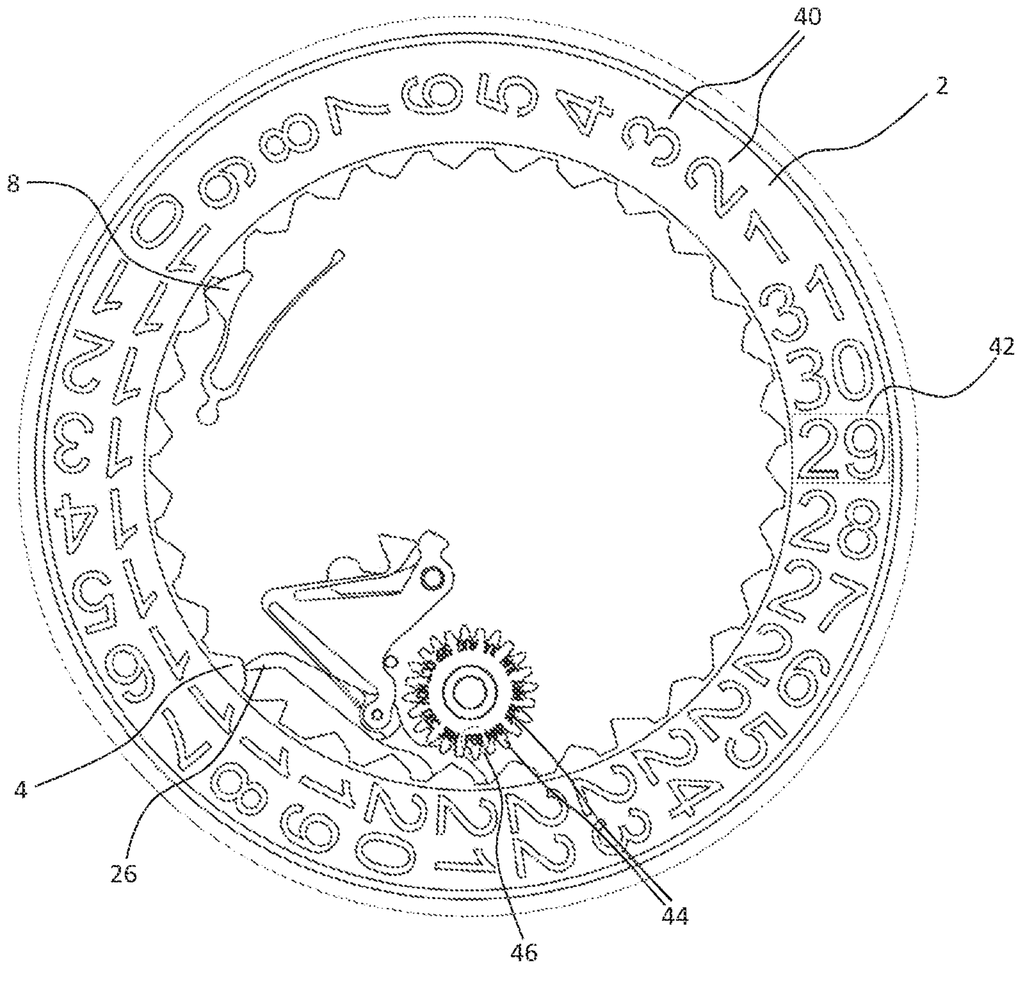
FIG. 4 shows a top view of the timepiece mechanism in FIGS. 1 and 2, illustrated from the opposite face to the one in FIGS. 1 and 2, the correction mobile being in a second state.
Figure 5A:
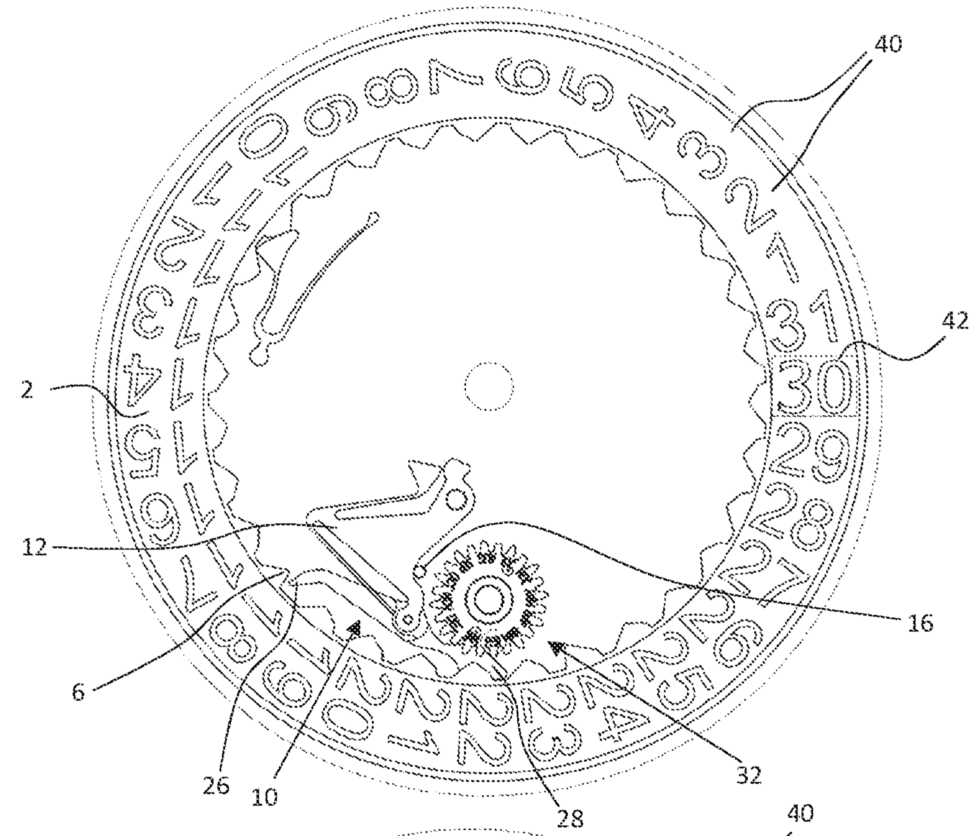
FIGS. 5*a* to 5*e* show views similar to the one in FIG. 4, illustrating successive phases in the operation of the timepiece mechanism during the change of the day of the month from the thirtieth of a short month to the first of the following month.
Figure 5B:
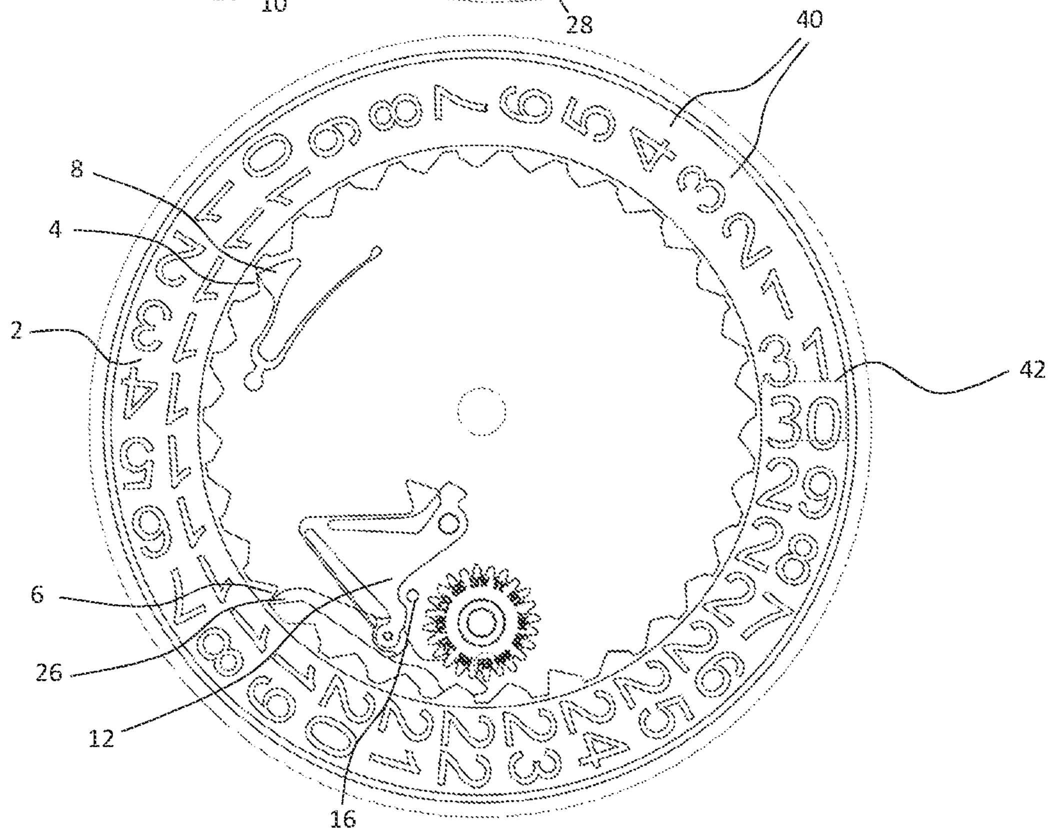

Such a situation occurs for example from the 1st to the 29th of a short month, the correction mobile 32 being in a second state, as illustrated in FIG. 4. Thus, from the 1st to the 29th of a short month, the pawl 10 cannot drive the mobile 2 during the optional driving phase. On continuing along its path after the optional driving phase, the pawl 10 comes into contact with the first portion of a tooth of the first type 4 in the systematic driving phase and then turns the mobile 2 by one step in the clockwise direction of rotation in the view in FIG. 4.

On 30 November, the mechanism is in the situation illustrated in FIG. 2, the tooth of the second type 6 being positioned on the path of the pawl 10 as early as the optional driving phase. The shape of the active flank of the tooth 6 then makes it possible for the pawl 10 to drive the mobile 2 by one step as early as the optional driving phase, and then to drive it by an additional step in the systematic driving phase.

FIGS. 5*a* to 5*e* illustrate the chronology of the driving of the mobile 2 by the pawl 10 when the day of the month passes from the 30th of a short month to the 1st of the next month, each of the optional driving phase and the systematic driving phase being broken down into a plurality of steps. A part of the timepiece mechanism 1 is shown in these figures in a top view from the dial side of the corresponding timepiece.

FIG. 5*a* illustrates the configuration of the timepiece mechanism 1 before the pawl 10 is actuated by the drive mobile of the timepiece movement. A drive finger (not shown) can thus be provided in order to move the pawl 10 once per day, by rotation of its base 12 in the clockwise direction of rotation.

As is apparent from FIG. 5*a*, the correction mobile 32 is in a second state corresponding to a short month having fewer than 31 days, the tail 28 of the pawl 10 being arranged between two teeth of the second wheel 36 of the correction mobile 32, and thus bearing against a portion of small radius of the second wheel 36.

Thus, during the optional driving phase, the path of the pawl 10 intercepts the toothset of the mobile 2. On the 30th of the month, the tooth of the second type 6 is situated along the travel corresponding to the optional driving phase of the pawl 10. As a result, the latter cooperates therewith so as to drive the mobile 2 and advance it by a first step.

The start of this first step is illustrated in FIG. 5*b*, by the fact that the mobile 2 has started to turn in the clockwise direction of rotation in the view in FIG. 5*b*, counter to the force to which it is subjected by the jumper 8. Specifically, the latter is no longer arranged in simultaneous abutment against two adjacent teeth of the mobile 2, as is normally the case in the rest position, since it is only in abutment against the inactive flank of a tooth 4.

Inscriptions 40 of the date have been shown on the mobile 2. These inscriptions 40 can be carried directly by the mobile 2 or, alternatively, by an additional disc secured to the mobile 2, by way of non-limiting illustration. An aperture 42 is also shown in order to schematically indicate the position at which the date is read according to the embodiment illustrated, in a non-limiting manner.

Figure 5C:
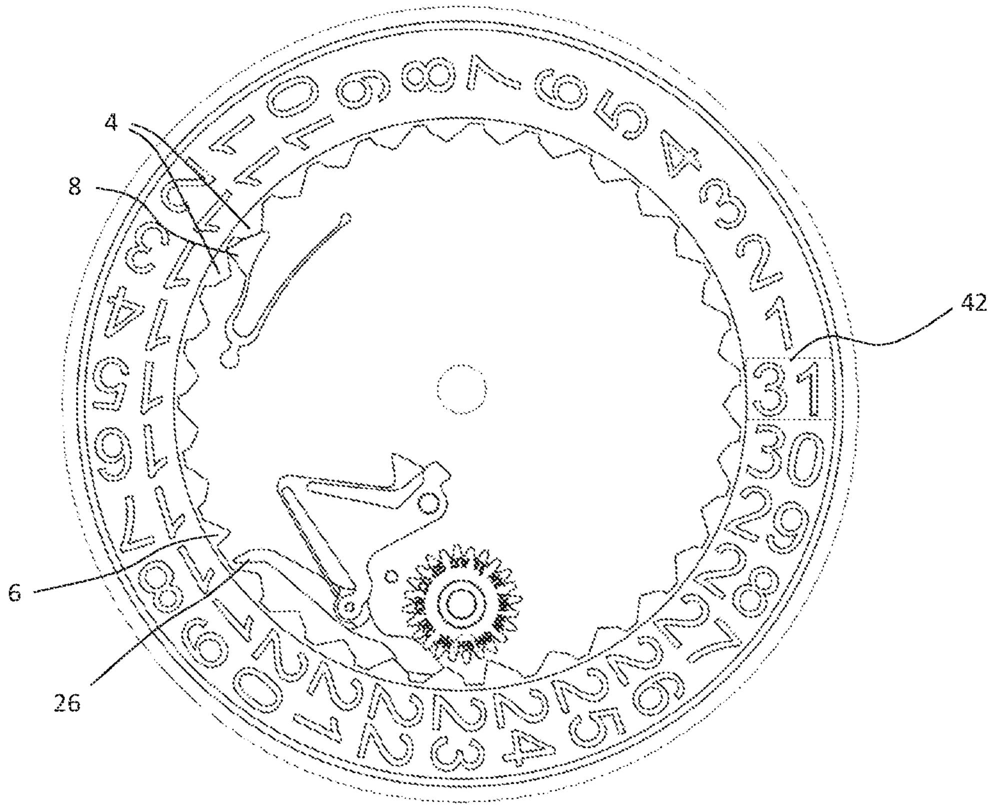

When the jumper 8 passes over the top of the tooth 4 against which it is in abutment, it exerts a pressure force on the active flank of this same tooth 4, this having the effect of turning the mobile 2 into its next discrete position, as shown in FIG. 5*c*, in which the jumper 8 is arranged simultaneously in abutment against two adjacent teeth 4. The inscription 40 of "31" is then situated facing the aperture 42.

With the drive mobile continuing to turn the base 12 of the pawl 10 in the clockwise direction of rotation, the latter catches up with the tooth of the second type 6 which was moved forward under the effect of the action of the jumper 8.

At the same time, the tail 28 of the pawl 10 is moved away from the correction mobile 32 and the angular orientation of the arm 22 is then defined by the action of the spring 30 and by the interaction of the beak 26 with the toothset of the mobile 2, and no longer by the tail 28 bearing against the second wheel 36 of the correction mobile 32, in a non-limiting illustrative manner.

Figure 5D:
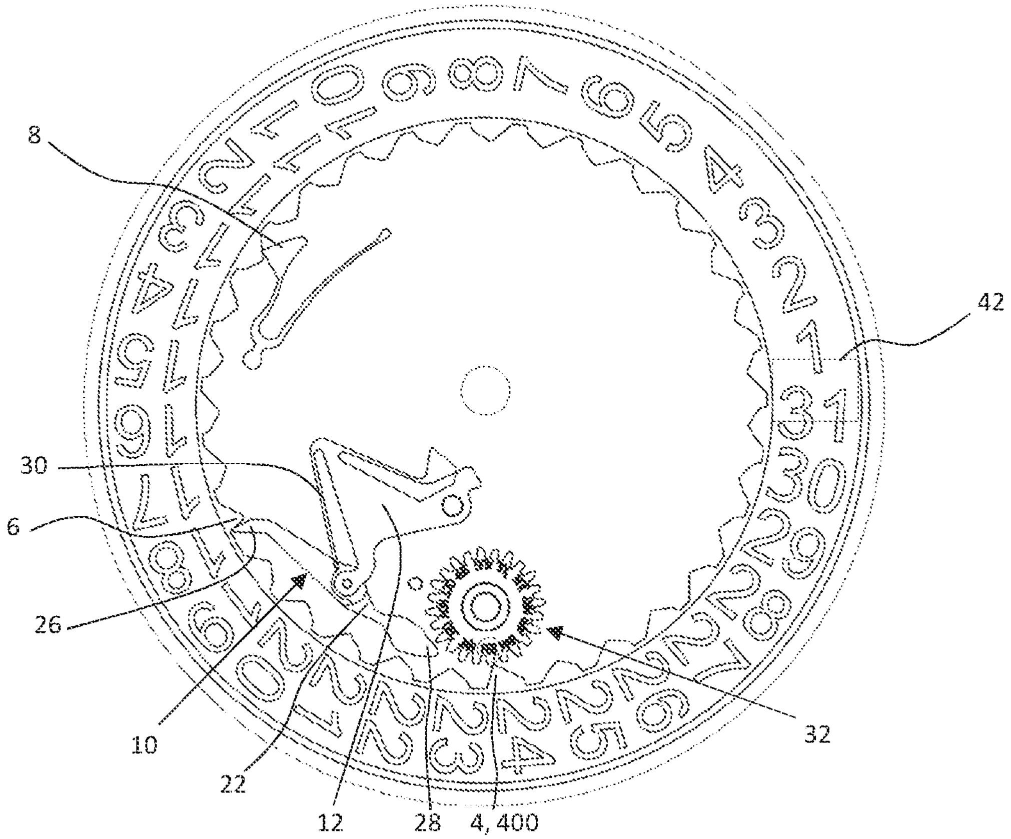

On continuing to move, under the effect of the action of the drive mobile, the pawl 10 begins the systematic driving phase by starting to drive the mobile 2 counter to the force of the jumper 8 again, putting the mechanism into the configuration illustrated in FIG. 5*d*.

Provision may be made for the correction mobile 32 to bear inscriptions 44 indicating the current month that are designed to cooperate with a suitable aperture 46. Thus, the inscription 44 relating to the month of February appears in the aperture 46 in the configurations illustrated in FIGS. 4 to 5*d*.

As mentioned above, the prominent tooth 400 has a height greater than that of the other teeth. It is apparent from FIGS. 5*d* and 5*e* that, when the date mobile 2 passes from the position associated with the 31st of a given month to that associated with the 1st of the next month, the prominent tooth 400 meshes with the toothset of the first wheel 34 of the correction mobile so as to turn the first wheel 34 by two steps in the clockwise direction of rotation in the view in FIGS. 5*d* and 5*e*. By virtue of this operation, the correction mobile 32 turns from an angular orientation associated with a given month to another angular position associated with the next month.

Figure 5E:
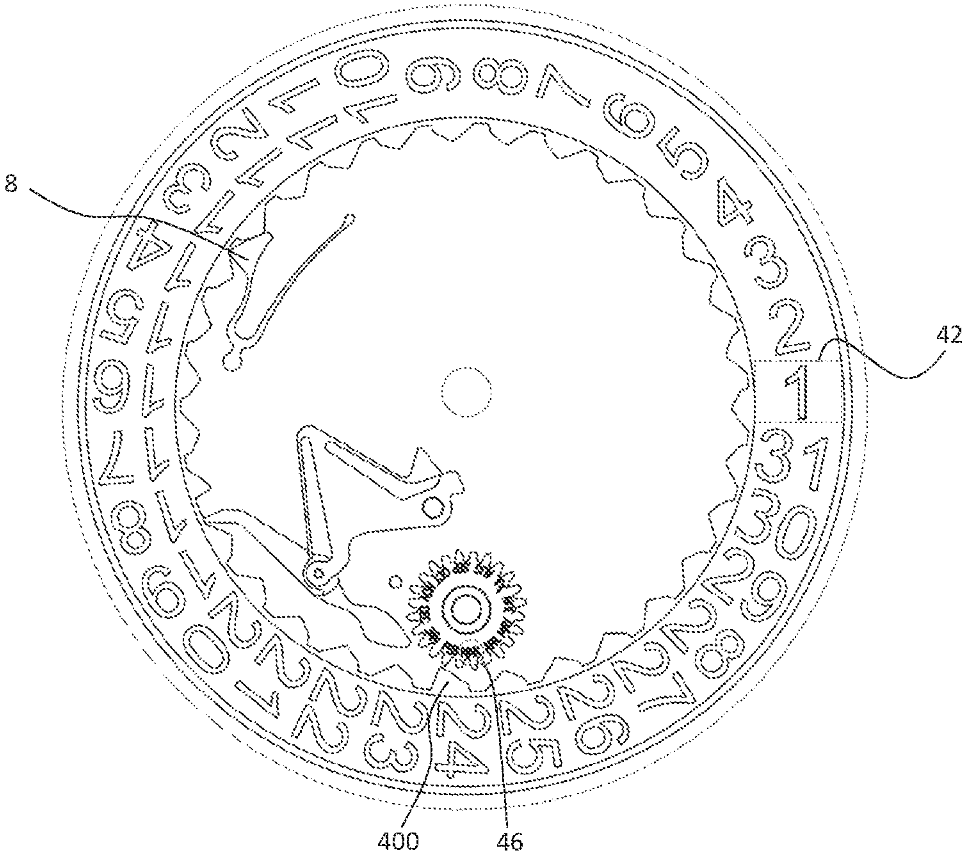

Once the top of the tooth 4 has been passed over, the jumper 8 acts on the active flank of this same tooth 4 in order to complete the movement of the mobile 2, as illustrated in FIG. 5*e*. The inscription 40 of "1" is then correctly positioned facing the aperture 42, and in the same way the inscription 44 relating to the next month is positioned properly facing the aperture 46 after the correction mobile 32 has been driven by two steps in the clockwise direction of rotation.

At the end of the cycle, the pawl 10 returns to its rest position, meaning the position in which it is in abutment against the fixed pin 16.

By turning through two steps, the correction mobile 32 is in this case passed from a second state corresponding to a short month to a first state corresponding to a long month. Thus, by returning into its rest position, the pawl 10 no longer cooperates with a portion of reduced radius of the second wheel 36 but with one of the teeth thereof, in the position shown in FIG. 6*a*.

Of course, the forces respectively applied by the return member to the base 12, for the one part, and by the spring 30 to arm 22 of the pawl 10, for the other part, are adjusted relative to one another such that, when the drive finger releases the pawl 10 and the base 12 is driven in rotation in the anticlockwise direction in FIG. 5*e*, under the effect of the action of the return member, the arm 22 can pivot in the clockwise direction, bearing on the tooth of the second wheel 36. Thus, the action of the return member takes precedence over that of the spring 30.

Figure 6A:
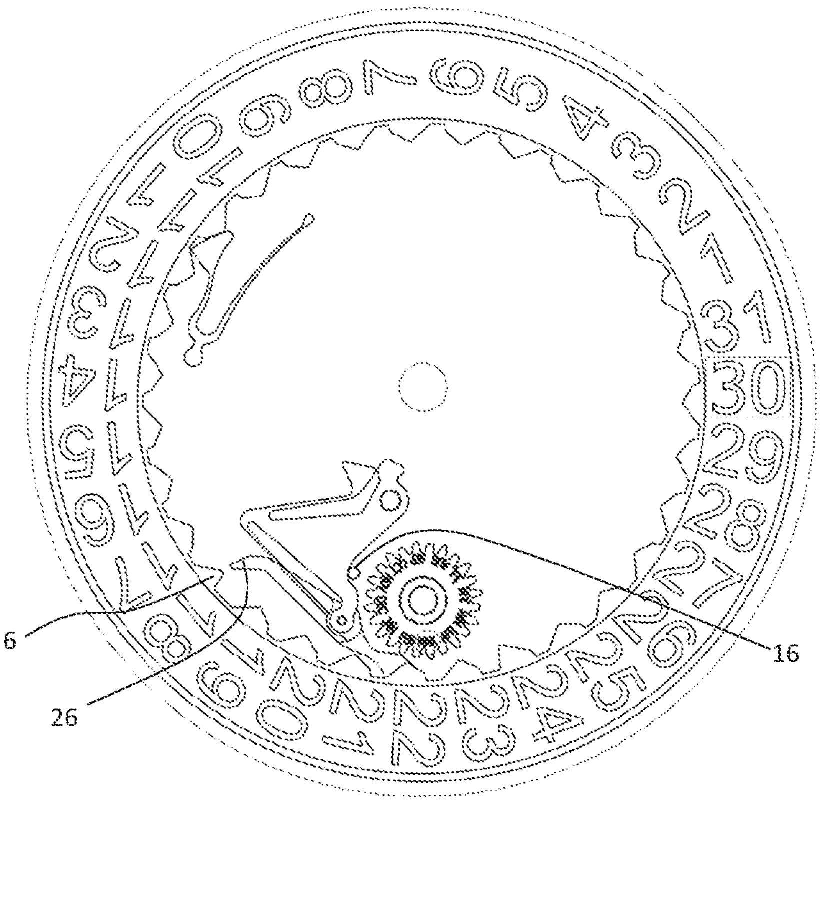
FIGS. 6*a* to 6*c* shows view similar to the one in FIG. 4, illustrating successive phases in the operation of the timepiece mechanism during the change of the day of the month from the thirtieth to the thirty-first of a long month.
Figure 6B:
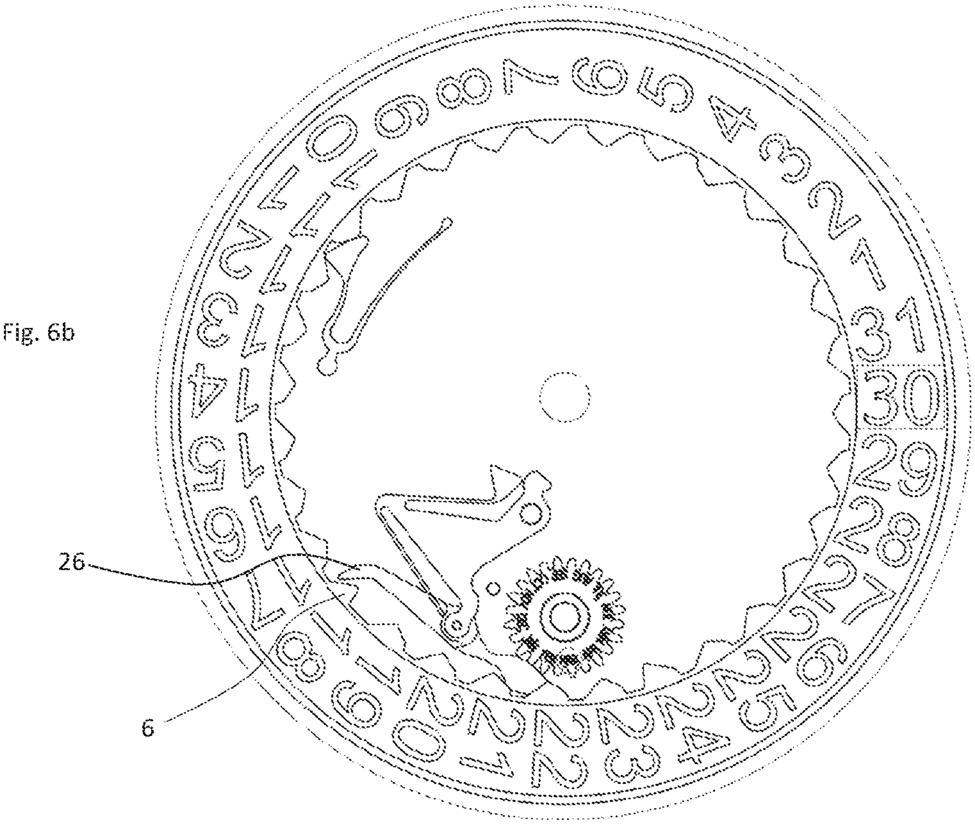
Figure 6C:
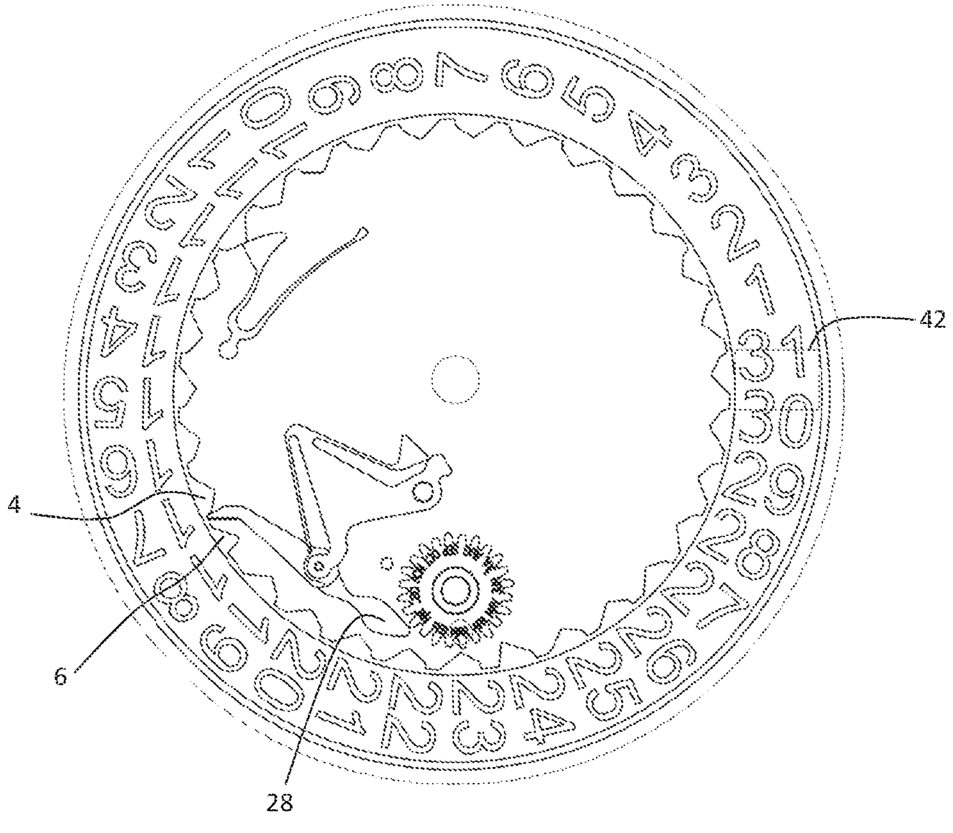

FIGS. 6*a* to 6*c* show the passage from the 30th to the 31st of a long month. On the 30th of the month, the tooth of the second type 6 is situated along the travel of the pawl 10 during the optional driving phase. The correction mobile 32 is in its second state and diverts the pawl 10, the beak 26 of which passes over the tooth of the second type 6 without driving it during the actuation of the base 12. The beak 26 then dips behind the tooth of the second type 6 in order to drive the tooth of the first type 4 that directly follows it, during the systematic driving phase (FIGS. 6*b* and 6*c*).

By virtue of the features that have just been presented, a timepiece mechanism is obtained that has a mobile that is able to be driven by a variable number of steps by virtue of the intended interaction between the actuating pawl of the mobile in question and a suitable correction mobile, which is able to take up at least one first state and one second state, different from the first state, in order to define two different paths of the actuating pawl.

The implementation of the present invention is not limited to the display of the date. Specifically, a person skilled in the art will have no particular difficulty in adapting the present teaching to the implementation of another type of timepiece mechanism, in particular a mechanism for displaying a variable other than the date.

The above description aims to describe a particular embodiment by way of non-limiting illustration and the invention is not limited to the implementation of certain particular features that have just been described, for example the shape of the correction mobile 32 or the nature of its interaction with the pawl 10, as described and illustrated. Specifically, it is sufficient, in order to implement the invention, for the correction mobile to have two different states in which it interacts in two different respective manners with the actuating pawl in order to define two different paths of the latter. Thus, it may be conceivable to provide for the correction mobile to comprise simply a shuttle that moves back and forth and bears a cam having two portions with different radii. The existence of optional and systematic driving phases, as described, is not indispensable to the implementation of the invention, either, and nor is the order in which they follow one another. It will thus be noted, for example, that in the case of a mobile having an external toothset, it will be simpler to provide for the systematic driving phase to occur before the optional driving phase.

Furthermore, an approach other than a geometric approach could be provided to ensure the differentiation of the interactions that occur between the pawl and the teeth of the first type, for the one part, and the tooth of the second type, for the other part. Thus, the active flanks of these teeth could for example be differentiated by using different roughnesses or by implementing different magnetic interactions.

Generally, while the pawl 10 described and illustrated in the present application is made in two parts (the base 12 and the arm 26), it is likewise possible to make it using more components or, conversely, to make it in one piece, for example on the basis of the teaching in the patent application CH 713288 A1.

Also generally, when the path of the pawl can be broken down into an optional driving phase and a systematic driving phase, provision may be made for the correction mobile to interact with the pawl throughout the optional driving phase or only during a part of this phase without departing from the scope of the invention. Furthermore, interaction between the correction mobile and the pawl outside the optional driving phase is likewise conceivable without departing from the scope of the invention.

The above disclosure allows persons skilled in the art to produce a wide variety of timepiece mechanisms having a mobile that is able to be driven by a variable number of steps by a pawl that always has the same travel, making it possible to advance the mobile by the maximum number of steps possible, the pawl cooperating with a correction mobile in order to define several paths of the pawl within this travel, depending on the state of the correction mobile, and thus to define the number of steps by which the mobile is advanced for a given state, depending on their specific needs, and without departing from the scope of the present invention.

What is claimed is:

1. A timepiece mechanism for a timepiece movement, comprising:

a toothed mobile comprising a toothset having at least one tooth of a first type and at least one tooth of a second type, a jumper designed to cooperate with said toothset so as to define discrete positions of said toothed mobile, a pawl intended to be actuated by a drive mobile of the timepiece movement in order to act on said toothset, said pawl exhibiting a travel, on each actuation, such that the pawl is able to act on said toothset in order to move said toothed mobile by two steps on each actuation, wherein the timepiece mechanism has a correction mobile having at least one first state and at least one second state, different from the first state, said correction mobile being designed so as to be able to cooperate with said pawl, during the actuation of said pawl, to define at least two different paths of said pawl that are associated with said first state and with said second state, respectively, and wherein said pawl and said correction mobile are designed such that, on each actuation of said pawl:

said pawl acts on said toothset to move said toothed mobile by one step, and said pawl acts on said toothset to move said toothed mobile by an additional step only when said correction mobile is in a second state and said at least one tooth of the second type is situated along the travel of said pawl.

2. The timepiece mechanism of claim 1, wherein said toothed mobile, said pawl and said correction mobile are designed such that the travel of said pawl is capable of two successive phases:

a first driving phase in which said toothset is able to be driven by one step only when said correction mobile is in a second state and said at least one tooth of the second type is situated along the travel of said pawl, and a systematic driving phase in which said toothset is able to be driven by one step, regardless of the type of tooth situated along the toothset's travel and regardless of the state of said correction mobile.

3. The timepiece mechanism of claim 2, wherein said toothed mobile is designed to pivot, said toothset being an internal toothset, and wherein said toothed mobile, said pawl and said correction mobile are designed such that said first driving phase occurs before said systematic driving phase.

4. The timepiece mechanism of claim 2, wherein said correction mobile has a cam against the periphery of which said pawl is kept in abutment during the first driving phase, enabling modification of the path of said pawl, said periphery having at least first and second radii that are different and associated with said first and second states, respectively, of said correction mobile.

5. The timepiece mechanism of claim 2, wherein said toothed mobile is intended to be secured to a date display mobile or to drive a date display mobile, wherein said toothset of said toothed mobile has thirty teeth of the first type and one tooth of the second type, wherein said pawl is able to be actuated once per day in order to move said toothed mobile by one or two steps, and wherein said correction mobile is a month mobile designed such that said correction mobile's angular orientation, associated at each moment with a given month, passes from one month to the next at each month end.

6. The timepiece mechanism of claim 3, wherein each of said at least one tooth of the first type has an active flank, intended to cooperate with said pawl, that is different from the active flank of said at least one tooth of the second type, such that the cooperation between said pawl and said toothset in said first driving phase, when said correction mobile is in a second state, only gives rise to a force driving said toothed mobile that is sufficient to overcome the action of said jumper when a tooth of the second type is situated along the travel of said pawl.

7. The timepiece mechanism of claim 6, wherein said active flank of said at least one tooth of the first type comprises, from the bottom of said toothset, a first portion having a first mean inclination, with respect to the radial direction, and then a second portion having a second mean inclination, with respect to the radial direction, greater than said first mean inclination, and wherein said active flank of said at least one tooth of the second type has a third mean inclination, with respect to the radial direction, smaller than said second mean inclination.

8. The timepiece mechanism of claim 6, wherein said correction mobile has a cam against the periphery of which said pawl is kept in abutment during the first driving phase, enabling modification of the path of said pawl, said periphery having at least first and second radii that are different and associated with said first and second states, respectively, of said correction mobile.

9. The timepiece mechanism of claim 6, wherein said toothed mobile is intended to be secured to a date display mobile or to drive a date display mobile, wherein said toothset of said toothed mobile has thirty teeth of the first type and one tooth of the second type, wherein said pawl is able to be actuated once per day in order to move said toothed mobile by one or two steps, and wherein said correction mobile is a month mobile designed such that said correction mobile's angular orientation, associated at each moment with a given month, passes from one month to the next at each month end.

10. The timepiece mechanism of claim 7, wherein said second mean inclination is substantially between 30 and 85 degrees with respect to the radial direction.

11. The timepiece mechanism of claim 7, wherein said first mean inclination is substantially between 0 and 25 degrees with respect to the radial direction.

12. The timepiece mechanism of claim 7, wherein said third mean inclination is substantially between 0 and 25 degrees with respect to the radial direction.

13. The timepiece mechanism of claim 4, wherein said correction mobile has a toothset intended to cooperate with at least one prominent tooth of said toothed mobile that exhibits a height greater than that of the other teeth of said toothed mobile, in order to modify the angular orientation of said cam.

14. The timepiece mechanism of claim 4, wherein said toothed mobile is intended to be secured to a date display mobile or to drive a date display mobile, wherein said toothset of said toothed mobile has thirty teeth of the first type and one tooth of the second type, wherein said pawl is intended to be actuated once per day in order to move said toothed mobile by one or two steps, and wherein said correction mobile is a month mobile designed such that the month mobile's angular orientation, associated at each moment with a given month, passes from one month to the next at each month end.

15. The timepiece mechanism of claim 1, wherein said toothed mobile is able to be secured to a date display mobile or to drive a date display mobile, wherein said toothset of said toothed mobile has thirty teeth of the first type and one tooth of the second type, wherein said pawl is able to be actuated once per day in order to move said toothed mobile by one or two steps, and wherein said correction mobile is a month mobile designed such that said correction mobile's angular orientation, associated at each moment with a given month, passes from one month to the next at each month end.

16. A timepiece movement including a timepiece mechanism comprising:

a toothed mobile comprising a toothset having at least one tooth of a first type and at least one tooth of a second type, a jumper designed to cooperate with said toothset so as to define discrete positions of said toothed mobile, a pawl intended to be actuated by a drive mobile of the timepiece movement in order to act on said toothset, said pawl exhibiting a travel, on each actuation, such that the pawl is able to act on said toothset in order to move said toothed mobile by two steps on each actuation, wherein the timepiece mechanism has a correction mobile having at least one first state and at least one second state, different from the first state, said correction mobile being designed so as to be able to cooperate with said pawl, during the actuation of said pawl, to define at least two different paths of said pawl that are associated with said first state and with said second state, respectively, and wherein said pawl and said correction mobile are designed such that, on each actuation of said pawl:

said pawl acts on said toothset to move said toothed mobile by one step, and said pawl acts on said toothset to move said toothed mobile by an additional step only when said correction mobile is in a second state and said at least one tooth of the second type is situated along the travel of said pawl.

17. The timepiece movement of claim 16, wherein said toothed mobile, said pawl and said correction mobile are designed such that the travel of said pawl has two successive phases:

a first driving phase in which said toothset is able to be driven by one step only when said correction mobile is in a second state and said at least one tooth of the second type is situated along the travel of said pawl, and a systematic driving phase in which said toothset is able to be driven by one step, regardless of the type of tooth situated along said toothset's travel and regardless of the state of said correction mobile.

18. The timepiece movement of claim 17, wherein said toothed mobile is designed to pivot, said toothset being an internal toothset, wherein said toothed mobile, said pawl and said correction mobile are designed such that said first driving phase occurs before said systematic driving phase, and wherein each of said at least one tooth of the first type has an active flank, intended to cooperate with said pawl, that is different from the active flank of said at least one tooth of the second type, such that the cooperation between said pawl and said toothset in said first driving phase, when said correction mobile is in a second state, only gives rise to a force driving said toothed mobile that is sufficient to overcome the action of said jumper when a tooth of the second type is situated along the travel of said pawl.

19. A timepiece having a timepiece movement according to claim 16.

20. A timepiece having a timepiece movement according to claim 18.

* * * * *